US012001714B2

United States Patent
Mallick et al.

(10) Patent No.: US 12,001,714 B2
(45) Date of Patent: Jun. 4, 2024

(54) HOST DEVICE IO SELECTION USING BUFFER AVAILABILITY INFORMATION OBTAINED FROM STORAGE SYSTEM

(71) Applicant: Dell Products L.P., Round Rock, TX (US)

(72) Inventors: Sanjib Mallick, Bangalore (IN); Vinay G. Rao, Bangalore (IN); Krishna Deepak Nuthakki, Bangalore (IN); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 17/888,566

(22) Filed: Aug. 16, 2022

(65) Prior Publication Data

US 2024/0061609 A1     Feb. 22, 2024

(51) Int. Cl.
*G06F 3/06*     (2006.01)
(52) U.S. Cl.
CPC .......... *G06F 3/0656* (2013.01); *G06F 3/0611* (2013.01); *G06F 3/067* (2013.01)
(58) Field of Classification Search
CPC ...... G06F 3/0656; G06F 3/0611; G06F 3/067; G06F 3/0653; G06F 3/061
USPC ........................................................ 711/154
See application file for complete search history.

(56) References Cited

U.S. PATENT DOCUMENTS

| | | | |
|---|---|---|---|
| 6,567,397 B1 | 5/2003 | Campana, Jr. et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Hua J Song
(74) *Attorney, Agent, or Firm* — Ryan, Mason & Lewis, LLP

(57) ABSTRACT

An apparatus in one embodiment comprises at least one processing device that includes a processor coupled to a memory. The processing device is configured to obtain buffer availability information from a storage system, the buffer availability information indicating that the storage system is currently experiencing a deficiency in a number of available buffers of a given one of at least first and second different buffer sizes supported by the storage system, and to select particular input-output operations for delivery to the storage system over one or more networks based at least in part on the obtained buffer availability information. Obtaining the buffer availability information from the storage system illustratively comprises sending at least one command from a host device to the storage system. First and second different buffer types having the first and second different buffer sizes may comprise respective different write buffer types within a larger write buffer.

20 Claims, 4 Drawing Sheets

(56) References Cited

U.S. PATENT DOCUMENTS

| | | | |
|---|---|---|---|
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 8,972,657 B1 | 3/2015 | Armangau et al. | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,733,846 B1 | 8/2017 | Wigmore et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,911,402 B2 | 2/2021 | Pusalkar et al. | |
| 11,012,512 B1* | 5/2021 | Mallick | H04L 67/1097 |
| 11,086,785 B2 | 8/2021 | Anchi et al. | |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salli | |
| 2008/0301332 A1 | 12/2008 | Butler et al. | |
| 2009/0259749 A1 | 10/2009 | Barrett et al. | |
| 2009/0292834 A1 | 11/2009 | Neemidge et al. | |
| 2010/0251267 A1 | 9/2010 | Zwisler et al. | |
| 2010/0313063 A1 | 12/2010 | Venkataraja et al. | |
| 2011/0029730 A1 | 2/2011 | Durocher et al. | |
| 2011/0197027 A1 | 8/2011 | Balasubramanian et al. | |
| 2011/0296230 A1 | 12/2011 | Chen et al. | |
| 2012/0072652 A1* | 3/2012 | Celis | G06F 12/0893 711/159 |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0290571 A1 | 10/2013 | Rizzo et al. | |
| 2013/0339551 A1 | 12/2013 | Flanagan et al. | |
| 2014/0105068 A1 | 4/2014 | Xu | |
| 2015/0169233 A1 | 6/2015 | Anderson et al. | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0092364 A1 | 3/2016 | Feng et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0286483 A1* | 9/2019 | Chitnis | G06F 9/50 |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0019054 A1 | 1/2021 | Anchi et al. | |
| 2021/0026551 A1 | 1/2021 | Tidke et al. | |
| 2021/0026650 A1 | 1/2021 | Rao et al. | |
| 2021/0064286 A1* | 3/2021 | Jung | G06F 3/0611 |
| 2021/0157502 A1 | 5/2021 | Rao et al. | |
| 2021/0181965 A1 | 6/2021 | Anchi et al. | |

OTHER PUBLICATIONS

International Search Report and Written Opinion of PCT/US2019/053204 dated Dec. 16, 2019, 40 pages.
International Search Report and Written Opinion of PCT/US2019/053473 dated Dec. 19, 2019, 16 pages.
International Search Report and Written Opinion of PCT/US2019/067144 dated May 4, 2020, 26 pages.
Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMware, "Multipathing Configuration for Software ISCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: ISCSI Implementation for Dell EMC Storage Arrays Running PowerMaxOS," Technical White Paper, Sep. 2019, 35 pages.
VMware Knowledge Base, "8GB Emulex HBAs May Not React to RSCN Events Properly on Older Firmware Versions," https://kb.vmware.com/s/article/2005235, Sep. 20, 2013, 1 page.
Netapp Knowledge Base, "San Host Does Not Failover I/O to Alternate Paths When One or More Paths Are Removed and an RSCN is Not Received," https://kb.netapp.com/app/answers/answer_view/a_id/1074454/~/san-host-does-not-failover-i%2Fo-to-alternate-paths-when-one-or-more-paths-are, Nov. 11, 2018, 3 pages.
Redhat, "Device-Mapper-Multipath on RHEL5 Experiences Excessive Delay in Detecting a Lost Path from a Storage Failure that

(56) References Cited

OTHER PUBLICATIONS

Produces No RSCN or Loop/Link Error," https://access.redhat.com/solutions/23576, Mar. 21, 2014, 2 pages.

Qlogic Corporation, "Release Notes," ftp://supermicro.com/driver/Broadcom/B57BCMCD_T7.12b.4.1/Windows_64/FCoE/release.txt, 2014, 10 pages.

E. Goggin et al., "Linux Multipathing," Proceedings of the Linux Symposium, vol. 1, Jul. 2005, pp. 147-167.

K. Ueda et al., "Request-based Device-mapper Multipath and Dynamic Load Balancing," Proceedings of the Linux Symposium, vol. 2, Jun. 2007, pp. 235-243.

B. Tulman, "In-Band and out-of-Band Network Management," http://www.learncomputer.com/in-band-out-of-band-network-management/, May 18, 2010, 2 pages.

NVM Express, "Nvm Express Base Specification, Revision 2.0b," NVM Express, Jan. 6, 2022, 455 pages.

U.S. Appl. No. 17/383,672 filed in the name of Amit Pundalik Anchi et al. filed Jul. 23, 2021, and entitled "Multi-Path Layer Configured to Access Storage-Side Performance Metrics for Load Balancing Policy Control."

U.S. Appl. No. 17/503,562 filed in the name of Amit Pundalik Anchi et al. filed Oct. 18, 2021, and entitled "Dynamic Chunk Size Adjustment for Cache-Aware Load Balancing."

\* cited by examiner

STORAGE-SIDE BUFFER AVAILABILITY INFORMATION MAINTAINED BY STORAGE ARRAY

| BUFFER SIZE 1 | NUMBER OF AVAILABLE BUFFERS | THRESHOLD 1 |
| --- | --- | --- |
| BUFFER SIZE 2 | NUMBER OF AVAILABLE BUFFERS | THRESHOLD 2 |
| ... | | |
| BUFFER SIZE X | NUMBER OF AVAILABLE BUFFERS | THRESHOLD X |

FIG. 4

HOST DEVICE IO SELECTION USING BUFFER AVAILABILITY INFORMATION OBTAINED FROM STORAGE SYSTEM

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. In these and other situations involving processing of IO requests received from a host device, a storage system may utilize one or more local caches in processing the received IO requests. For example, write requests received from a given host device may be initially stored in one or more write caches of the storage system, and then acknowledged back to the host device, before being destaged to a destination storage device of the storage system. Performance of the storage system in these and other situations that involve processing IO requests received from one or more host devices can be adversely impacted by cache-related issues of the storage system.

SUMMARY

Illustrative embodiments configure one or more host devices to select IO operations for delivery to a storage system based at least in part on buffer availability information obtained by the one or more host devices from the storage system. The host devices illustratively communicate with a storage array or other type of storage system via a storage area network (SAN) or other type of network. The host devices illustratively comprise a multi-path layer that includes multi-path input-output (MPIO) drivers configured to process IO operations of respective ones of the host devices.

Such host IO selection arrangements using storage-side buffer availability information as disclosed herein can advantageously ensure that any temporary deficiencies that may arise in numbers of available storage system buffers of particular sizes are taken into account in the host device IO operation selection process.

For example, responsive to an indication obtained from the storage system that the storage system is currently experiencing a deficiency in available buffers of one or more particular buffer sizes, the host device can temporarily prioritize for selection those IO operations having data sizes that are matched to one or more buffer sizes that are not currently in a deficiency in the storage system, over those IO operations having data sizes that are matched to one or more buffer sizes that are currently in a deficiency in the storage system.

In some embodiments, selecting particular IO operations for delivery to the storage system based at least in part on the obtained buffer availability information comprises, responsive to the buffer availability information indicating that there is a deficiency in a number of available buffers of a relatively smaller size within the storage system, temporarily prioritizing selection of IO operations having data sizes that are matched to a relatively larger size.

The temporary prioritizing of selection of IO operations having data sizes that are matched to the relatively larger size illustratively continues for a period of time that is determined based at least in part on an amount of time required for the storage system to configure additional buffers of the relatively smaller size.

Accordingly, illustrative embodiments allow the storage system sufficient time to configure additional buffers of the one or more needed sizes, without unduly delaying IO operations requiring buffers of other sizes, thereby helping to alleviate the above-noted adverse impacts of cache-related issues of the storage system.

In one embodiment, an apparatus comprises at least one processing device that includes a processor and a memory, with the processor being coupled to the memory. The at least one processing device is configured to obtain buffer availability information from a storage system, the buffer availability information indicating that the storage system is currently experiencing a deficiency in a number of available buffers of a given one of at least first and second different buffer sizes supported by the storage system, and to select particular IO operations for delivery to the storage system over one or more networks based at least in part on the obtained buffer availability information.

Obtaining the buffer availability information from the storage system illustratively comprises sending at least one command from a host device to the storage system to obtain the buffer availability information. For example, the at least one command may comprise at least one of a vendor unique command, a mode sense command and a log sense command of at least one storage access protocol.

First and second different buffer types having the respective first and second different buffer sizes may comprise respective different write buffer types within a larger write buffer of the storage system.

Additionally or alternatively, the first and second different buffer types having the respective first and second different buffer sizes may comprise respective cache slots of respective first and second different cache slot sizes in one or more caches of the storage system. Numerous other arrangements of buffers of different sizes are possible.

In some embodiments, the buffer availability information comprises an indication of a number of available buffers for each of one or more of the first and second different buffer types of respective first and second different sizes in the storage system.

Additionally or alternatively, the buffer availability information may comprise an indication of an under-threshold condition for a number of available buffers for a particular one of the first and second different buffer types having respective ones of the first and second different buffer sizes in the storage system.

As another example, the buffer availability information may comprise an indication that the storage system is currently working to increase a number of available buffers for a particular one of the first and second different buffer types having respective ones of the first and second different buffer sizes in the storage system.

In some embodiments, selecting particular IO operations for delivery to the storage system over one or more networks based at least in part on the obtained buffer availability information comprises, responsive to the buffer availability information indicating that a number of available buffers of the first size is below a threshold, temporarily prioritizing selection of IO operations having data sizes that are matched to the second size.

The temporary prioritizing of selection of IO operations having data sizes that are matched to the second size illustratively continues for a period of time that is determined based at least in part on an amount of time required for the storage system to configure additional buffers of the first size.

For example, in some embodiments, the first size is smaller than the second size, and the storage system configures additional buffers of the first size by converting each of a plurality of buffers of the second size into multiple buffers of the first size.

In some embodiments, the temporary prioritizing of selection of IO operations having data sizes that are matched to the second size is illustratively configured to prevent delay of a given IO operation having a data size that is matched to the first size from exceeding a specified timeout limit.

These and other illustrative embodiments include, without limitation, apparatus, systems, methods and computer program products comprising processor-readable storage media.

BRIEF DESCRIPTION OF THE DRAWINGS

FIG. 4 shows an example of storage-side buffer availability information maintained by a storage system for use in host IO selection in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
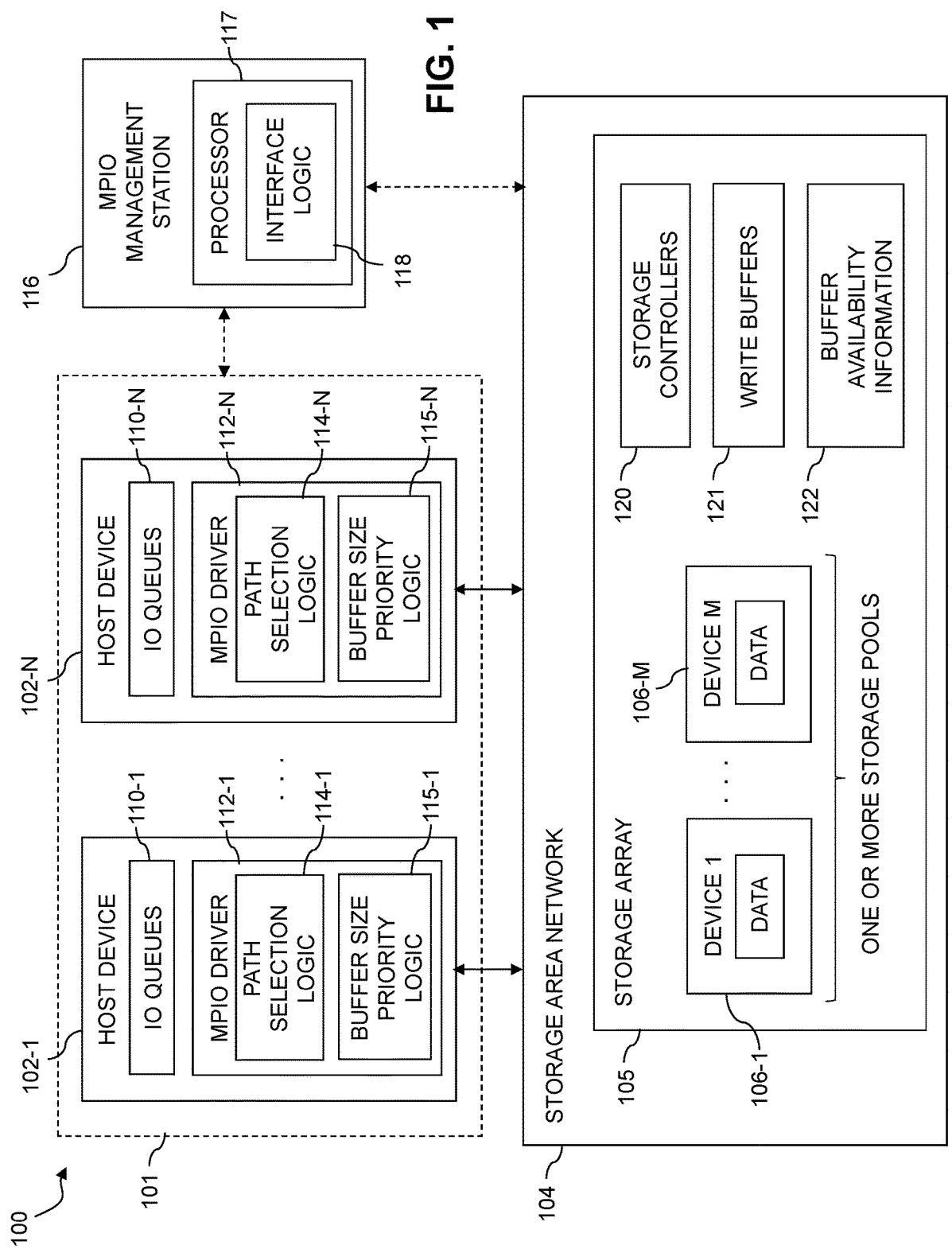
FIG. 1 is a block diagram of an information processing system configured with functionality for host device IO selection using storage-side buffer availability information in an illustrative embodiment.

FIG. 1 shows an information processing system 100 configured in accordance with an illustrative embodiment. The information processing system 100 comprises a computer system 101 that includes a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102.

The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for host IO selection using storage-side buffer availability information as disclosed herein. Such functionality is illustratively provided at least in part using respective instances of buffer size priority logic 115-1, . . . 115-N implemented within the MPIO drivers 112. For example, in some embodiments, the instances of buffer size priority logic 115 are configured, responsive to storage-side buffer availability information obtained by the respective corresponding MPIO drivers 112 indicating that there is a deficiency in a number of available buffers of a relatively smaller size within the storage array 105, to cause the MPIO drivers 112 to temporarily prioritize selection of IO operations having data sizes that are matched to a relatively larger size.

The term "storage-side buffer availability information" as used herein is intended to be broadly construed so as to encompass information that characterizes relative availabilities of numbers of buffers of respective different sizes within the storage array 105, such as, for example, the numbers of currently available buffers of each of the different sizes, and additional or alternative indications, such as indications as to whether or not the numbers of currently available buffers of each of the different sizes are at or above one or more corresponding threshold numbers of available buffers. The term "storage-side buffer availability information" as broadly used herein is intended to encompass information that is gathered and maintained by the storage array 105, although it is to be appreciated that at least portions of such information are periodically or otherwise obtained by the MPIO drivers 112 from the storage array 105 and stored on the host side of the system 100 in illustrative embodiments herein.

The MPIO drivers 112 may comprise, for example, otherwise conventional MPIO drivers, such as PowerPath® drivers from Dell Technologies, suitably modified in the manner disclosed herein to provide functionality for host IO selection using storage-side buffer availability information. Other types of MPIO drivers from other driver vendors may be suitably modified to incorporate functionality for host IO selection using storage-side buffer availability information as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering selected IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The particular functionality of an individual MPIO driver, such as MPIO driver 112-1, as described above and elsewhere herein, is assumed in some embodiments to be similarly implemented in each of the other MPIO drivers 112.

In the FIG. 1 embodiment, the storage array 105 comprises a plurality of storage controllers 120, one or more sets of write buffers 121, and one or more instances of storage-side buffer availability information 122.

The storage controllers 120 illustratively control the processing of IO operations received in the storage array 105 from the host devices 102. For example, the storage controllers 120 illustratively manage the processing of read and write commands directed by the MPIO drivers 112 to particular ones of the storage devices 106. The storage controllers 120 can be implemented as respective storage processors, storage directors or other storage system components configured to control storage system operations relating to processing of IO operations.

The write buffers 121 illustratively comprise at least at least first and second different buffer types of respective first and second different buffer sizes in the storage array 105. For example, the write buffers 121 may include multiple distinct buffer sizes, such as two or more of 8K, 16K, 32K, 64K, 128K and so on.

In some embodiments, the write buffers 121 comprise multiple distinct write buffer types within a larger write buffer of the storage array 105. Such a write buffer in some embodiments is also referred to as a "write cache." The storage array 105 in a given embodiment can include multiple such write caches, illustratively for caching write requests from respective different ones of the host devices 102.

Additionally or alternatively, the write buffers 121 can comprise respective cache slots of at least respective first and second different cache slot sizes in one or more caches of the storage array 105. Numerous other arrangements of buffers of different sizes are possible. Terms such as "buffer" and "write buffer" as used herein are therefore intended to be broadly construed, and should not be viewed as limited to any particular buffer sizes or configurations.

In some embodiments, each of the storage controllers 120 has a different portion of the write buffers 121 associated therewith, although numerous alternative arrangements are possible. The storage controllers 120 are examples of what are more generally referred to herein as "cache entities" of the storage array 105. A given "cache entity" of a storage system as the term is broadly used herein is intended to encompass a storage controller, storage processor, storage director or other system component that has a local cache or other type of cache allocated thereto or otherwise associated therewith. The caches illustratively include write buffers 121, although other types of caches can be used in other embodiments. These are considered examples of "storage caches" as they are implemented in the storage array 105 or other type of storage system, rather than in host devices 102. The term "storage cache" as broadly used herein therefore refers to a cache implemented in a storage system.

Accordingly, in some embodiments, the cache entities of the storage array 105 comprise respective storage controllers 120 of the storage array 105 that have respective portions of write buffers 121 associated therewith. As another example, in some embodiments, each of the storage controllers 120 has a different allocated portion of a global cache associated therewith, and such allocated portions of a global cache can be considered respective portions of write buffers 121 associated with respective storage controllers 120.

The storage-side buffer availability information 122 is illustratively maintained by the storage array 105 for the write buffers 121, and can be arranged, for example, in the manner illustrated in the example of FIG. 4, or utilizing other types and arrangements of tables or other data structures.

The buffer availability information 122 in some embodiments indicates relative availabilities of at least first and second different buffer types of respective first and second different sizes in the write buffers 121. For example, the buffer availability information 122 can comprise an indication of a number of available buffers for each of the at least first and second different buffer types of respective first and second different sizes in the write buffers 121. Additionally or alternatively, the buffer availability information 122 can comprise an indication of an under-threshold condition for a number of available buffers for a particular one of the at least first and second different buffer types of respective first and second different sizes in the write buffers 121, and/or an indication that the storage array 105 is currently working to increase a number of available buffers for a particular one of the at least first and second different buffer types of respective first and second different sizes in the write buffers 121.

The numbers of buffers of the respective different buffer types of respective different buffer sizes in the write buffers 121 in some embodiments are automatically determined, illustratively at least in part by one or more machine learning algorithms implemented in the storage array 105. For example, a given such machine learning algorithm can determine the particular distributions of buffer sizes that are normally needed for handling IO operations from particular applications of different types. Such a machine learning algorithm can, for example, learn different buffer size distributions for different types of applications, such as different types of database applications (e.g., an Oracle database application and a Microsoft SQL database application), and automatically adjust the numbers of available buffer sizes accordingly, with such adjustments being reflected in the buffer availability information 122.

It is assumed that the MPIO drivers 112 of the respective host devices 102 can read or otherwise obtain at least portions of the storage-side buffer availability information 122 directly or indirectly from the storage array 105. The obtained portions of the storage-side buffer availability information 122 can therefore comprise one or more subsets of such information, or substantially all of the available information. The obtained portions can additionally or alternatively include summary information or other types of information characterizing the buffer availability information 122.

In some embodiments, the buffer availability information 122 indicates that the storage array 105 is currently experiencing a deficiency in a number of available buffers of a given one of at least first and second different buffer sizes supported by the storage array 105. For example, the deficiency may be indicated by the number of available buffers of the given buffer size falling below a corresponding threshold in the storage array 105.

Accordingly, the particular types and arrangements of buffer availability information 122 obtained by the MPIO drivers 112 from the storage array 105 can differ in format, configuration or other respects from the buffer availability information 122 as actually maintained within the storage array 105. The term "buffer availability information" as used herein is therefore intended to be broadly construed.

In some embodiments, at least portions of the storage-side buffer availability information 122 can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format, NVMe format or other type of format.

A wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different types of storage-side buffer availability information 122. Separate commands are utilized in some embodiments to obtain respective different portions of the storage-side buffer availability information 122. In other embodiments, a single command can be sent to obtain storage-side buffer availability information 122. These and other references herein to sending a command from a host device to a storage array to obtain at least portions of the storage-side buffer availability information 122 are intended to be broadly construed. For example, such commands may be sent periodically, illustratively in accordance with a given predetermined interval or set of multiple intervals, and/or under other conditions. However, the term "periodically" as used herein is intended to be broadly construed and should not be viewed as limited to particular fixed or regularly recurring intervals.

Additionally or alternatively, at least portions of the storage-side buffer availability information 122 can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

The MPIO driver 112-1 in some embodiments is configured to obtain at least portions of the storage-side buffer availability information 122 maintained by storage array 105 in conjunction with processing of IO operations directed to the storage array 105 by host device 102-1 over SAN 104, where the obtained buffer availability information indicates relative availabilities of at least first and second different buffer types of respective first and second different sizes in the write buffers 121 of the storage array 105. This buffer availability information illustratively includes an indication that the storage array 105 is currently experiencing a deficiency in a number of available buffers of at least a given one of the first and second different buffer types of the respective first and second different sizes. The term "currently" as used in this context is intended to be broadly construed, so as to encompass arrangements in which the deficiency is detected or otherwise exists for at least a portion of a time period for which the buffer availability information is made available to the host device 102-1 by the storage array 105. Also, the term "deficiency" is similarly intended to be broadly construed herein, so as to encompass, for example, a condition in which the number of available buffers within the storage array 105 has fallen below a corresponding threshold.

The MPIO driver 112-1 is further configured to select particular IO operations for delivery to the storage array 105 over the SAN 104 based at least in part on the obtained buffer availability information. In some embodiments, at least portions of the above-noted operations can be performed at least in part by other components of the host device 102-1 or by other processing devices, such as the MPIO management station 116.

As indicated above, the buffer availability information is illustratively obtained from the storage array utilizing at least one of an in-band communication mechanism in which one or more commands in a designated storage protocol are sent from the host device 102-1 to the storage array 105, and an out-of-band communication mechanism in which, for example, host management software of the host device 102-1 communicates with storage system management software of the storage array 105 over an IP connection or other type of network connection.

In some embodiments, the MPIO driver 112-1 selects an IO operation, and illustratively also selects an appropriate path for delivery of the selected IO operation to the storage array 105, based at least in part on the buffer availability information obtained from the storage array 105. The selected IO operation is then delivered to the storage array 105 over the SAN 104 via the selected path.

For example, in selecting particular IO operations for delivery to the storage array 105 based at least in part on the obtained buffer availability information, the MPIO driver 112-1, responsive to the buffer availability information indicating that a number of available buffers of a first size is below a threshold, temporarily prioritizes selection of IO operations having data sizes that are matched to a second size, where the second size is illustratively larger than the first size. The temporary prioritizing of selection of IO operations having data sizes that are matched to the second size continues for a period of time that is determined based at least in part on an amount of time required for the storage array 105 to configure additional buffers of the first size. In some embodiments, the storage system configures additional buffers of the first size by converting each of a plurality of buffers of the second size into multiple buffers of the first size. The temporary prioritizing of selection of IO operations having data sizes that are matched to the second size is configured to prevent delay of any IO operation having a data size that is matched to the first size from exceeding a specified timeout limit.

In these and other embodiments, the MPIO driver 112-1 is configured, responsive to the buffer availability information indicating that there is a deficiency in a number of available buffers of a relatively smaller size within the storage array 105, to temporarily prioritize selection of IO operations having data sizes that are matched to a relatively larger size.

An example of a process illustrating one possible implementation of the above-noted functionality for host IO selection using storage-side buffer availability information will be described below in conjunction with the flow diagram of FIG. 2.

Again, in some embodiments, at least portions of the above-described host IO selection functionality can be performed at least in part by other components of the host device 102-1 or by other processing devices, such as the MPIO management station 116, rather than by the MPIO driver 112-1. References herein to such functionality being performed by "at least one processing device" can refer to the host device 102-1 or a portion thereof, or multiple processing devices possibly including multiple host devices 102 and/or the MPIO management station 116. Numerous other arrangements of one or more processing devices can be used to implement the techniques disclosed herein.

The above-described functionality associated with host IO selection using storage-side buffer availability information is illustratively performed primarily by the MPIO driver 112-1 of the host device 102-1, utilizing its buffer size priority logic 115-1 in cooperation with its path selection logic 114-1, although other arrangements are possible. For example, these and other functions referred to herein as being performed by an MPIO driver can in other embodiments be performed at least in part by other host device components.

An example of a set of storage-side buffer availability information 122 maintained by the storage array 105 for respective LUNs or other logical storage devices is illustrated in FIG. 4. It is assumed that the storage array 105 maintains similar storage-side buffer availability information for each of at least a subset of the logical storage devices of the storage array 105.

As noted above, in some embodiments, storage-side buffer availability information is obtained directly by the host device 102-1 from storage array 105. Such an arrangement illustratively utilizes an in-band communication mechanism in which one or more commands in a designated storage protocol are sent from the host device 102-1 to the storage array 105.

It is possible in other embodiments that storage-side buffer availability information can be obtained by the host device 102-1 indirectly from the storage array 105 utilizing an out-of-band communication mechanism via at least one intermediary device. An intermediary device in such an embodiment illustratively comprises the MPIO management station 116 of system 100, although additional or alternative intermediary devices can also be used. The MPIO management station 116 can comprise a server configured to obtain the storage-side buffer availability information directly from the storage array 105. The MPIO management station 116 is illustratively connected directly to the storage array 105 using protocols such as SCSI, Internet SCSI (iSCSI), FC, NVMeoFC and/or others.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to obtain storage-side buffer availability information or other types of information to facilitate host IO selection using storage-side buffer availability information as disclosed herein.

Some embodiments are implemented in the form of an algorithm performed by cooperative interaction between the MPIO driver 112-1 of a given one of the host devices 102-1 and the storage array 105, utilizing path selection logic 114-1 and buffer size priority logic 115-1. Such an algorithm is more particularly implemented by cooperative interaction of instances of path selection logic 114 and instances of buffer size priority logic 115 of MPIO drivers 112 of host devices 102, and storage controllers 120 of storage array 105, possibly with involvement of one or more other components of system 100, such as MPIO management station 116, which can provide the above-noted PPMA functionality.

Illustrative embodiments provide significant advantages over conventional practice. For example, these embodiments provide an efficient algorithm for host IO selection using storage-side buffer availability information.

These and other embodiments avoid the significant negative performance implications that might otherwise arise if the storage array 105 were to run out of buffers of a particular size. For example, if the storage array 105 were to run out of buffers of a relatively small size, IO operations matched to that size would have to be stored in larger buffers, which is wasteful of buffer space in the storage array 105. Moreover, processing of other IO operations could be delayed or otherwise interrupted when the storage array 105 has to replenish its supply of buffers of the relatively small size, illustratively by converting each of a plurality of buffers of the larger size to multiple buffers of the relatively small size. Such issues are alleviated in illustrative embodiments herein. As a result, IO processing performance is improved, and the system can more easily meet its performance goals.

The portions of the example techniques described above as being performed by a given MPIO driver 112-1 on a corresponding host device 102-1 can be similarly performed by other MPIO drivers 112 on respective other host devices 102. Such MPIO drivers 112 illustratively form a multi-path layer comprising multi-pathing software of the host devices. Other types of host drivers can be used in other embodiments. For example, in some embodiments, at least a portion of the disclosed functionality for host IO selection using storage-side buffer availability information is carried out using one or more iSCSI drivers, or other types of non-MPIO host drivers.

Additional examples of arrangements for host IO selection using storage-side buffer availability information will be described elsewhere herein in conjunction with the embodiments of FIGS. 2 through 4. Other types of arrangements for host IO selection using storage-side buffer availability information can be used in other embodiments.

These and other functions related to host IO selection using storage-side buffer availability information that are referred to herein as being performed by or under the control of the MPIO driver 112-1 can in some embodiments be performed at least in part outside of the MPIO driver 112-1, such as in the host device 102-1 generally.

The above-described functions associated with host IO selection using storage-side buffer availability information in the MPIO driver 112-1 in some embodiments are carried out at least in part under the control of its buffer size priority logic 115-1, illustratively operating in cooperation with path selection logic 114-1. For example, the buffer size priority logic 115-1 is illustratively configured to control prioritization of selection of IO operations that are matched to particular buffer sizes not currently in deficiency in the storage array 105, as indicated by the buffer availability information. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for host IO selection using buffer availability information obtained from the storage array 105 as described above.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality. Such conventional MPIO functionality is suitably modified in illustrative embodiments disclosed herein to support the disclosed host IO selection using storage-side buffer availability information.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Base Specification, Revision 2.0b, Jan. 6, 2022, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, Asymmetric Logical Unit Access (ALUA) arrangements and/or Asymmetric Namespace Access (ANA) arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and buffer size priority logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 204, and is suitable for use in the system 100 but is more generally applicable to other types of information processing systems comprising one or more host devices that are each configured to access at least one logical storage device of a storage system. The storage system in this embodiment is assumed to comprise at least one storage array having a plurality of storage devices. The storage devices can include logical storage devices such as LUNs or other logical storage volumes.

Figure 2:
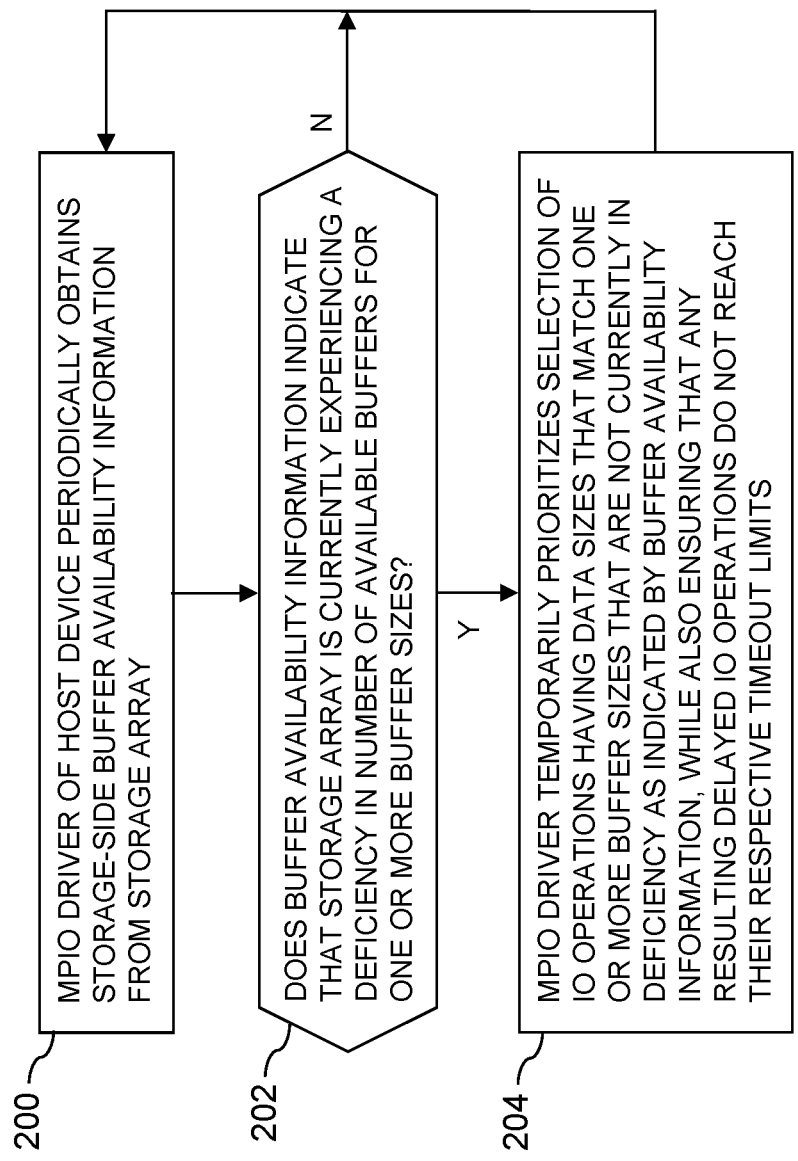
FIG. 2 is a flow diagram of a process for host device IO selection using storage-side buffer availability information in an illustrative embodiment.

The steps of the FIG. 2 process are illustratively performed at least in part by or under the control of a particular one of the host devices 102. For example, portions of the process may be carried out under the control of software, firmware and/or hardware of the particular one of the host devices 102.

Accordingly, the FIG. 2 process may be viewed as an example of an algorithm performed in part by the one of the host devices 102 utilizing its corresponding one of the MPIO drivers 112 and its corresponding instances of path selection logic 114 and buffer size priority logic 115. It is to be appreciated that other arrangements of host device components, storage array components and/or other system components can be configured to perform at least portions of one or more of the steps in other embodiments.

In step 200, an MPIO driver of a host device periodically obtains storage-side buffer availability information from a storage array. The obtained availability information illustratively includes at least portions of a set of buffer availability information maintained by the storage array, such as at least portions of the buffer availability information 122 maintained by the storage array 105 in the FIG. 1 embodiment.

In step 202, a determination is made, illustratively by the MPIO driver, as to whether or not the obtained buffer availability information indicates that the storage array is currently experiencing a deficiency in the number of available buffers for one or more buffer sizes. Responsive to a negative determination, the process returns to step 200, and otherwise moves to step 204.

In step 204, which is reached if the obtained buffer availability information indicates that the storage array is currently experiencing a deficiency in the number of available buffers in the storage array for at least one buffer size, the MPIO driver temporarily prioritizes selection of IO operations having data sizes that match one or more buffer sizes that are not currently in deficiency as indicated by the buffer availability information, while also ensuring that any resulting delayed IO operations do not reach their respective timeout limits. In other words, to the extent that the prioritization in step 204 causes delays for respective IO operations having data sizes that match one or more buffer sizes that are currently in deficiency, any such delay for a given IO operation is controlled by the MPIO driver to ensure that a timeout of the given IO operation is not caused by the delay. The prioritization in step 204 is illustratively a temporary prioritization that gives the storage array sufficient time to configure additional buffers of any size or sizes that are currently in deficiency. The temporary prioritization can end after a predetermined period of time and/or under other specified conditions such as a detected change in the buffer availability information.

After step 204, the process returns to step 200 as indicated, at which point it can iterate substantially continuously through one or more additional instances of at least a subset of steps 200, 202 and 204.

Also, multiple additional instances of the FIG. 2 process may be performed at least in part in parallel with one another for respective different host devices.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for host IO selection using storage-side buffer availability information. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for host IO selection using storage-side buffer availability information within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
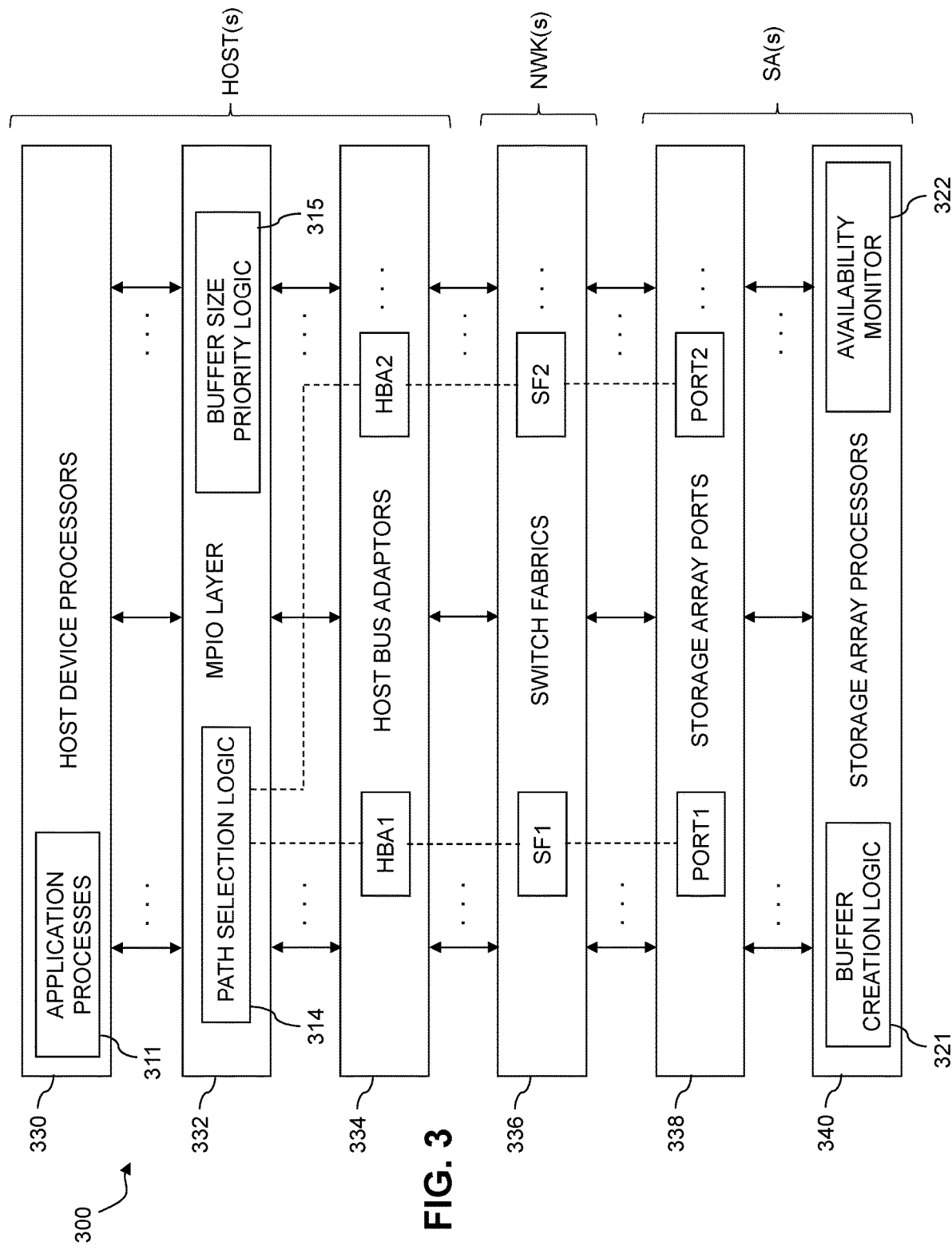
FIG. 3 is a block diagram showing multiple layers of a layered system architecture that includes a multi-path layer with functionality for host device IO selection using storage-side buffer availability information in an illustrative embodiment.

Referring now to FIG. 3, another illustrative embodiment is shown. In this embodiment, an information processing system 300 comprises host-side elements that include application processes 311, path selection logic 314 and buffer size priority logic 315, and storage-side elements that include buffer creation logic 321 and availability monitor 322.

In a manner similar to that described elsewhere herein, storage-side buffer availability information is obtained from one or more storage arrays by one or more host devices via their respective MPIO drivers and utilized by the MPIO drivers to select particular IO operations for delivery to particular logical storage devices of the one or more storage arrays over paths selected by the path selection logic 314. The selection of the particular IO operations is based at least in part on the buffer availability information and is illustratively performed by the buffer size priority logic 315.

The buffer creation logic 321 is configured to manage local caches of one or more storage arrays, although such local caches are not explicitly shown in the figure. For example, the buffer creation logic 321 illustratively carries out a process to generate additional buffers of a particular size when the availability monitor 322 indicates a deficiency in the number of available buffers of that particular size. The process carried out by the buffer creation logic 321 as triggered by one or more deficiency indications from the availability monitor 322 can include, for example, generating multiple buffers of a relatively small buffer size by breaking down and reconfiguring each of a plurality of buffers of a relatively large buffer size.

There may be separate instances of the above-noted host-side and storage-side components associated with each of a plurality of system components such as host devices and storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements host IO selection utilizing one or more MPIO drivers of the MPIO layer 332, and associated instances of buffer size priority logic 315. The application processes 311 generate IO operations that are processed by the MPIO layer 332 for delivery to the one or more storage arrays. Paths are determined by the path selection logic 314 for sending such IO operations to the one or more storage arrays. These IO operations are sent to the one or more storage arrays over one or more networks.

The MPIO layer 332 is an example of what is also referred to herein as a multi-path layer, and comprises one or more MPIO drivers implemented in respective host devices. Each such MPIO driver illustratively comprises respective instances of path selection logic 314 and buffer size priority logic 315 configured as previously described. Additional or alternative layers and logic arrangements can be used in other embodiments.

The buffer creation logic 321 implemented in the storage array processor layer 340 controls the configuration and operation of caches associated with respective cache entities of the system 300, such as multiple local caches associated with respective ones of a plurality of storage controllers of the system 300, including the deployment of different numbers of buffers of respective different sizes. For example, the buffer creation logic 321 can include functionality for allocating available cache resources among a plurality of cache entities of a given storage array of the system 300, including configuring multiple sets of buffers of different sizes. It is also possible in some embodiments that the buffer creation logic 321 can include multiple distinct cache control logic instances for multiple sets of cache entities of respective ones of a plurality of storage arrays of the system 300.

In the system 300, path selection logic 314 is configured to select different paths for sending IO operations from a given host device to a storage array, where the IO operations to be sent are selected under control of the buffer size priority logic 315 based at least in part on buffer availability information obtained from the one or more storage arrays. The paths used to send selected IO operations to the one or more storage arrays as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

It is assumed in this embodiment that the host devices through their respective MPIO drivers and respective instances of buffer size priority logic 315 provide functionality for host IO selection using storage-side buffer availability information as disclosed herein, possibly with involvement of other host device components such as the path selection logic 314, and additionally or alternatively with involvement of one or more other system components such as an MPIO management station or other arrangement of one or more external servers. For example, in some embodiments, the particular IO operations to be sent to particular logical storage devices of the one or more storage arrays are selected based at least in part on buffer availability information obtained by the MPIO drivers from the one or more storage arrays.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides at least portions of the disclosed functionality for host IO selection using storage-side buffer availability information, possibly with involvement of one or more other host device components.

Referring now to FIG. 4, an example of storage-side buffer availability information 400 maintained by a storage system such as storage array 105 is shown. The storage-side buffer availability information 400 is illustratively maintained by the storage array 105 for a particular set of write buffers that are illustratively part of one or more local caches of the storage array 105, although other arrangements are possible. Different sets of storage-side buffer availability information similar to storage-side buffer availability information 400 may be maintained for respective different sets of write buffers of the storage array 105.

The storage-side buffer availability information 400 may be viewed as one possible example of storage-side buffer availability information 122 of storage array 105 in the FIG. 1 embodiment, illustratively generated by a corresponding availability monitor not explicitly shown in FIG. 1. Similar storage-side buffer availability information may be generated by availability monitor 322 in the FIG. 3 embodiment.

The storage-side buffer availability information 400 more particularly includes numbers of available buffers for each of a plurality of different buffer sizes denoted as Buffer Size 1, Buffer Size 2, . . . Buffer Size X. For each such different buffer size, the storage-side buffer availability information 400 illustratively includes a corresponding number of available buffers. The numbers of available buffers of each buffer size dynamically vary over time as IO operations are received and processed in the storage array. Also associated with each of the different buffer sizes in this embodiment is a corresponding threshold number of buffers, with the thresholds being respectively denoted as Threshold 1, Threshold 2, . . . Threshold X for Buffer Size 1, Buffer Size 2, . . . Buffer Size X. In some embodiments, when the number of available buffers for a particular buffer size falls below its corresponding threshold, buffer creation logic of the storage array, such as buffer creation logic 321 of the FIG. 3 embodiment, is triggered to generate additional buffers of that particular size, so as to increase the number of available buffers above the corresponding threshold for that buffer size. Although the figure illustratively shows potentially different thresholds for each of the different buffer sizes, other embodiments can use the same threshold for multiple ones of the buffer sizes.

At least portions of the storage-side buffer availability information 400 are obtainable by the MPIO drivers of respective host devices and is utilized by those MPIO drivers in selecting IO operations for delivery to the storage array as disclosed herein.

The particular storage-side buffer availability information arrangement shown in FIG. 4 is only an example, and numerous other types and arrangements of storage-side buffer availability information can be maintained by a storage system in other embodiments.

For example, in some embodiments, the storage-side buffer availability information 400 can additionally or alternatively include an indicator that the storage array is currently working to increase the number of available buffers of a particular size, in order to address a previously-detected deficiency in the number of available buffers of the particular size. Such an indication that the storage array is currently working to increase a number of available buffers of a particular size is considered to be an example of buffer availability information indicating that the storage array is currently experiencing a deficiency in the number of available buffers of the particular size. As indicated previously, terms such as "storage-side buffer availability information" as used herein are intended to be broadly construed.

As noted above, the MPIO driver of a given one of the host devices 102 can obtain storage-side buffer availability information from the storage array 105 by sending commands to the storage array 105, in the manner previously described. Such obtained buffer availability information is illustratively stored in the given host device, but as it originates from the storage array 105, it is nonetheless referred to herein as "storage-side buffer availability information" in accordance with the broad usage of that term herein.

The storage-side buffer availability information 400 is illustratively stored in a storage array memory accessible to a multi-path layer of the host device. Other types of data structures can be used in other embodiments.

On the host side, at least portions of such storage-side buffer availability information obtained from the storage array and characterizing one or more logical storage devices are illustratively stored in a data structure of a kernel-space portion of the MPIO driver 112-1, although other storage arrangements with other types of data structures can be used.

In some embodiments, an MPIO driver obtains storage-side buffer availability information directly from a storage array, through interaction with the storage array as described elsewhere herein. For example, MPIO driver 112-1 is illustratively configured to obtain the storage-side buffer availability information directly from the storage array 105 utilizing an in-band communication mechanism in which one or more log sense commands, mode sense commands and/or vendor unique commands in a designated storage protocol are sent from the MPIO driver 112-1 or another host device component to the storage array 105.

However, it is possible in some embodiments that one or more MPIO drivers of one or more host devices can obtain the storage-side buffer availability information other than through direct communication with the storage array. Such arrangements illustratively involve obtaining the connectivity information indirectly from the storage array utilizing an out-of-band communication mechanism via at least one intermediary device, such as the MPIO management station 116, which may comprise one or more servers.

It is to be appreciated that the particular features and functionality of these embodiments, like those of other embodiments disclosed herein, can be varied in other embodiments. Additional illustrative embodiments will now be described in more detail with reference to an example storage array and one or more host devices equipped with example MPIO drivers, although it is to be appreciated that the disclosed techniques can be adapted in a straightforward manner to use with a wide variety of other types of storage arrays or other storage systems as well as different host devices having different types of MPIO drivers.

The storage array in these embodiments is assumed to comprise a PowerMax® storage array from Dell Technologies, and the MPIO drivers are assumed to comprise PowerPath® drivers also from Dell Technologies, both suitably modified as described herein to implement the disclosed functionality. Again, these are only examples, and other types of multi-pathing software and storage arrays can be used.

In some embodiments, a storage array comprises a write buffer implemented in a memory of the storage array. The write buffer is a temporal buffering area where incoming writes are saved and later destaged to the persistent storage media (e.g., flash drives or other types of solid state drives, hard disk drives, and many others). The usage of a write buffer is common in many storage arrays as host writes are often composed of IOs with smaller sizes than the flash memory page size. For example, an 8K host write will be saved to a 1M flash memory page, potentially creating waste. At some later point in time, the flash drive will defragment the data (e.g., store sets of multiple consecutive blocks in a single page), but this can lead to a problem known as flash performance jitter, as background defragmentation processes can adversely impact the performance of the flash drive.

The write buffer illustratively comprises multiple distinct buffers each having the same buffer size (e.g., a 128K page size, also sometimes referred to as a "cache slot") or having multiple distinct buffer sizes (e.g., 8K, 16K, 32K, 64K, 128K . . . ). Using the write buffer with multiple buffer sizes improves efficiency as small random writes (e.g., 8K writes) will not consume a large buffer (e.g., an entire 128K buffer), thereby avoiding waste.

The array in some embodiments is responsible for managing the number of write memory buffers of each size. If the IO profile is composed of relatively long writes, the array will configure more larger buffers, while if the IO profile is composed of relatively shorter writes, the array will make sure to have more smaller memory buffers.

Generally, for optimal usage, when a given write arrives, the closest size write memory buffer that can accommodate the data should be used to store the data. For example, if an 8K write arrives, the optimal write buffer to hold the data will be an 8K buffer. If 8K buffers are not available, then a 16K buffer may be used. There will be wasted buffer space in such an arrangement, but the data needs to be buffered in a write buffer that can accommodate it. If a 16K buffer is not available, then a 32K buffer (or an even larger buffer) may be used, resulting in an even larger amount of wasted buffer space.

Accordingly, when the correct size buffer is unavailable, a larger buffer is used which causes wasted buffer space. More particularly, the buffer is dedicated to a certain logical storage device data range and unless the write is a sequential write, the remaining buffer space will not be used.

When a shortage of smaller-sized buffers arises, larger buffers may each be converted to multiple smaller buffers. The process of converting a larger buffer into multiple smaller buffers requires adding space for more metadata. The reason that four 16K buffers require more metadata than one 64K buffer is that a buffer requires metadata describing the data in the buffer. For example, the metadata illustrative includes the LUN or other logical storage device identifier, the logical block address (LBA), stored data size and additional management metadata (e.g., locks, etc.). As a result, the process of converting a 64K buffer to four 16K buffers typically utilizes memory movements to make space for the additional metadata. Such memory movements are not simple or quick.

Accordingly, upon receiving a write for a buffer size that is unavailable or otherwise in short supply, the array will store the IO in a larger buffer (causing waste) and start a process to convert larger buffers into smaller buffers. Such a process may take seconds, and while it happens smaller IOs are stored in larger buffers causing waste and putting the array in danger of running out of buffers.

Illustrative embodiments disclosed herein address such issues by, for example, configuring an MPIO driver of a host device to obtain an indication from a storage array that there is a shortage of smaller buffers in the array, and to delay smaller IOs to give the array time to create smaller buffers (e.g., to convert larger buffers to smaller buffers).

An algorithm implemented by an MPIO driver in an illustrative embodiment includes the following steps, although it is to be appreciated that additional or alternative steps could be used in other embodiments:

1. The MPIO driver will periodically poll the storage array (e.g., once per second), illustratively utilizing a vendor unique (VU) command, or other type of command such as a mode sense command, a log sense command, etc., for the current count of the number of available buffers of each size within the storage array. Such information is an example of what is more generally referred to herein as "buffer availability information."

2. The MPIO driver will detect if the number of available buffers for each of a particular size or sizes falls below a corresponding user-defined threshold.

3. Upon detecting that the number of available buffers of at least one particular size has fallen below the threshold, the MPIO driver will modify its scheduling operation to give a preference to IOs with larger sizes.

4. This preferential scheduling implemented by the MPIO driver will continue until the number of buffers at the particular size is replenished, or until the IOs of the smaller sizes are close to reaching an IO timeout point.

The above-described example preferential scheduling will temporarily delay IOs with smaller sizes, but will prevent the exhausting of write buffers with larger sizes, which would have otherwise impacted the performance of larger IO sizes.

Accordingly, illustrative embodiments disclosed herein, by delaying smaller IO sizes when the smaller buffer sizes are limited in the storage array, prevents a possible expansion of the resource shortage into the larger buffer sizes, thereby preventing adverse impacts to all applications on the host.

It should be noted in this regard that the MPIO driver will not hold smaller IOs long enough to create IO timeout issues for those delayed IOs. Therefore, if a given smaller size IO has been delayed for too long as a result of the above-described preferential scheduling, such that it approaches its IO timeout point, the MPIO driver will schedule that IO for delivery to the storage array, so as to avoid the timeout for that IO.

These and other embodiments disclosed herein can help to ensure that the storage array will have an adequate supply of buffers available in each of the different buffer sizes to keep up with IO processing demand. For example, the temporal hold of IOs implemented by the MPIO driver in the manner described above will give the storage array the additional time that it needs (e.g., on the order of a few seconds) to create additional smaller size buffers from larger size buffers as needed.

The above-described features and functionality can be implemented with any host device and storage array or other storage system in which buffers of different sizes are used in the processing of IO operations.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for host IO selection using storage-side buffer availability information can be performed by different MPIO drivers in different host devices, or using other types of host drivers, such as, for example, iSCSI drivers. For example, portions of the disclosed techniques can be implemented through modification of any type of multipathing software, including Linux native multipathing software.

As indicated previously, illustrative embodiments disclosed herein can provide a number of significant advantages relative to conventional arrangements.

For example, these embodiments provide efficient algorithms for host IO selection using storage-side buffer availability information.

Such host IO selection arrangements using storage-side buffer availability information as disclosed herein can advantageously ensure that any temporary deficiencies that may arise in numbers of available storage system buffers of particular sizes are taken into account in the host device IO operation selection process.

For example, a host device can temporarily prioritize for selection those IO operations that are matched to buffer sizes that are not currently in deficiency or otherwise in short supply in the storage array. This avoids the wastage of buffer space that might otherwise occur if the storage array had to use relatively large buffers to accommodate respective IO operations having relatively small data sizes.

The temporary prioritizing of selection of IO operations having data sizes that are matched to the buffers sizes not currently experiencing a deficiency continues for a period of time that is determined based at least in part on an amount of time required for the storage system to configure additional buffers of the needed size or sizes.

Accordingly, illustrative embodiments allow the storage system sufficient time to configure additional buffers of the one or more needed sizes, without unduly delaying IO operations requiring buffers of other sizes, thereby helping to alleviate IO delays and other adverse impacts arising from cache-related issues of the storage system.

Illustrative embodiments can therefore prevent significant degradations in IO processing performance that might otherwise occur due to excessive mismatches between incoming IO operations and available buffer sizes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and buffer size priority logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, buffer size priority logic, buffer creation logic and additional or alternative components. Also, the particular configurations of system and device elements and associated processing operations illustratively shown in the drawings can be varied in other embodiments. For example, a wide variety of different host device configurations and associated arrangements for host IO selection using storage-side buffer availability information can be implemented in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
wherein the at least one processing device is configured:
to obtain, in a host device coupled to a storage system over one or more networks, buffer availability information from the storage system, the buffer availability information indicating that the storage system is currently experiencing a deficiency in a number of available buffers of a given one of at least first and second different buffer sizes supported by the storage system; and
to select in the host device particular input-output operations for delivery to the storage system over the one or more networks based at least in part on the obtained buffer availability information;
wherein selecting particular input-output operations for delivery to the storage system over one or more networks based at least in part on the obtained buffer availability information comprises, responsive to the buffer availability information indicating that a number of available buffers of the first size is below a threshold, temporarily prioritizing selection of input-output operations having data sizes that are matched to the second size.

2. The apparatus of claim 1 wherein the at least one processing device comprises the host device.

3. The apparatus of claim 1 wherein the host device comprises a multi-path layer that includes at least one multi-path input-output driver and wherein the obtaining and selecting are performed by the multi-path input-output driver.

4. The apparatus of claim 1 wherein first and second different buffer types having respective ones of the first and second different buffer sizes comprise respective cache slots having respective first and second different cache slot sizes in one or more caches of the storage system.

5. The apparatus of claim 1 wherein the buffer availability information comprises an indication of a number of available buffers for each of one or more of first and second different buffer types having respective ones of the first and second different buffer sizes in the storage system.

6. The apparatus of claim 1 wherein the buffer availability information comprises at least one of:
an indication of an under-threshold condition for a number of available buffers for a particular one of first and second different buffer types having respective ones of the first and second different buffer sizes in the storage system; and
an indication that the storage system is currently working to increase a number of available buffers for a particular one of first and second different buffer types having respective ones of the first and second different buffer sizes in the storage system.

7. The apparatus of claim 1 wherein obtaining the buffer availability information from the storage system comprises sending at least one command from the host device to the storage system to obtain the buffer availability information in the host device.

8. The apparatus of claim 7 wherein the at least one command comprises at least one of a vendor unique command, a mode sense command and a log sense command of at least one storage access protocol.

9. The apparatus of claim 1 wherein the temporary prioritizing of selection of input-output operations having data sizes that are matched to the second size continues for a period of time that is determined based at least in part on an amount of time required for the storage system to configure additional buffers of the first size.

10. The apparatus of claim 9 wherein the first size is smaller than the second size, and wherein the storage system configures additional buffers of the first size by converting each of a plurality of buffers of the second size into multiple buffers of the first size.

11. The apparatus of claim 1 wherein the temporary prioritizing of selection of input-output operations having data sizes that are matched to the second size is configured to prevent delay of a given input-output operation having a data size that is matched to the first size from exceeding a specified timeout limit.

12. The apparatus of claim 1 wherein first and second different buffer types having respective ones of the first and second different buffer sizes comprise respective different write buffer types within a larger write buffer of the storage system.

13. An apparatus comprising:
at least one processing device comprising a processor coupled to a memory;
wherein the at least one processing device is configured:
to obtain, in a host device coupled to a storage system over one or more networks, buffer availability information from the storage system, the buffer availability information indicating that the storage system is currently experiencing a deficiency in a number of available buffers of at least one buffer size of a plurality of different buffer sizes supported by the storage system; and
to select in the host device particular input-output operations for delivery to the storage system over the one or more networks based at least in part on the obtained buffer availability information;
wherein selecting particular input-output operations for delivery to the storage system over one or more networks based at least in part on the obtained buffer availability information comprises, responsive to the buffer availability information indicating that there is a deficiency in a number of available buffers of at least one of one or more relatively smaller sizes within the storage system, at least temporarily prioritizing selection of input-output operations having data sizes that are matched to at least one of one or more relatively larger sizes, the one or more relatively larger sizes being measured relative to the one or more relatively smaller sizes and vice-versa.

14. A computer program product comprising a non-transitory processor-readable storage medium having stored therein program code of one or more software programs, wherein the program code, when executed by at least one processing device comprising a processor coupled to a memory, causes the at least one processing device:
to obtain, in a host device coupled to a storage system over one or more networks, buffer availability information from the storage system, the buffer availability information indicating that the storage system is currently experiencing a deficiency in a number of available buffers of a given one of at least first and second different buffer sizes supported by the storage system; and
to select in the host device particular input-output operations for delivery to the storage system over the one or more networks based at least in part on the obtained buffer availability information;
wherein selecting particular input-output operations for delivery to the storage system over one or more networks based at least in part on the obtained buffer availability information comprises, responsive to the buffer availability information indicating that there is a deficiency in a number of available buffers of a relatively smaller size within the storage system, temporarily prioritizing selection of input-output operations having data sizes that are matched to a relatively larger size.

15. The computer program product of claim 14 wherein obtaining the buffer availability information from the storage system comprises sending at least one command from the host device to the storage system to obtain the buffer availability information in the host device.

16. A method comprising:
obtaining, in a host device coupled to a storage system over one or more networks, buffer availability information from the storage system, the buffer availability information indicating that the storage system is currently experiencing a deficiency in a number of available buffers of a given one of at least first and second different buffer sizes supported by the storage system; and selecting in the host device particular input-output operations for delivery to the storage system over the one or more networks based at least in part on the obtained buffer availability information;

wherein selecting particular input-output operations for delivery to the storage system over one or more networks based at least in part on the obtained buffer availability information comprises, responsive to the buffer availability information indicating that there is a deficiency in a number of available buffers of a relatively smaller size within the storage system. temporarily prioritizing selection of input-output operations having data sizes that are matched to a relatively larger size; and wherein the method is performed by at least one processing device comprising a processor coupled to a memory.

17. The method of claim 16 wherein obtaining the buffer availability information from the storage system comprises sending at least one command from the host device to the storage system to obtain the buffer availability information in the host device.

18. The method of claim 16 wherein the temporary prioritizing of selection of input-output operations having data sizes that are matched to the second size continues for a period of time that is determined based at least in part on an amount of time required for the storage system to configure additional buffers of the first size.

19. The method of claim 16 wherein the first size is smaller than the second size, and wherein the storage system configures additional buffers of the first size by converting each of a plurality of buffers of the second size into multiple buffers of the first size.

20. The method of claim 16 wherein the temporary prioritizing of selection of input-output operations having data sizes that are matched to the second size is configured to prevent delay of a given input-output operation having a data size that is matched to the first size from exceeding a specified timeout limit.

* * * * *